(12) United States Patent
Arlon

(10) Patent No.: US 7,419,291 B2
(45) Date of Patent: Sep. 2, 2008

(54) HEADLAMP COMPRISING ENERGY ABSORPTION MEANS

(75) Inventor: Philippe Arlon, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 36 days.

(21) Appl. No.: 11/453,859

(22) Filed: Jun. 16, 2006

(65) Prior Publication Data

US 2006/0232989 A1  Oct. 19, 2006

Related U.S. Application Data

(63) Continuation of application No. 10/665,764, filed on Sep. 18, 2003, now Pat. No. 7,156,545.

(30) Foreign Application Priority Data

Sep. 20, 2002 (FR) .................................. 02 11710

(51) Int. Cl.
*F21V 7/04* (2006.01)
(52) U.S. Cl. ....................................... 362/549; 362/546
(58) Field of Classification Search ................. 362/549
See application file for complete search history.

(56) References Cited

U.S. PATENT DOCUMENTS

| 4,475,148 | A | 10/1984 | Tomforde |
| 4,658,335 | A | 4/1987 | Culler |
| 4,996,634 | A | 2/1991 | Haneda et al. |
| 6,135,619 | A | 10/2000 | Donaire Camacho et al. |
| 6,190,030 | B1 | 2/2001 | Chase |
| 6,471,386 | B2 | 10/2002 | Oh |
| 2002/0008977 | A1 | 1/2002 | Baumann et al. |
| 2004/0136195 | A1 | 7/2004 | Chase |

FOREIGN PATENT DOCUMENTS

| EP | 1 059 200 | 12/2000 |
| EP | 1 155 907 | 11/2001 |
| JP | 2000280816 | 10/2000 |

*Primary Examiner*—Anabel M Ton
(74) *Attorney, Agent, or Firm*—Morgan & Finnegan, LLP

(57) ABSTRACT

The invention relates to a headlamp for a motor vehicle, comprising a housing enclosing a light source, fixed on a chassis, together with means for connecting the housing to the chassis, these means being deformable in a plastic way and capable of absorbing at least part of the energy of an impact on the headlamp.

10 Claims, 5 Drawing Sheets

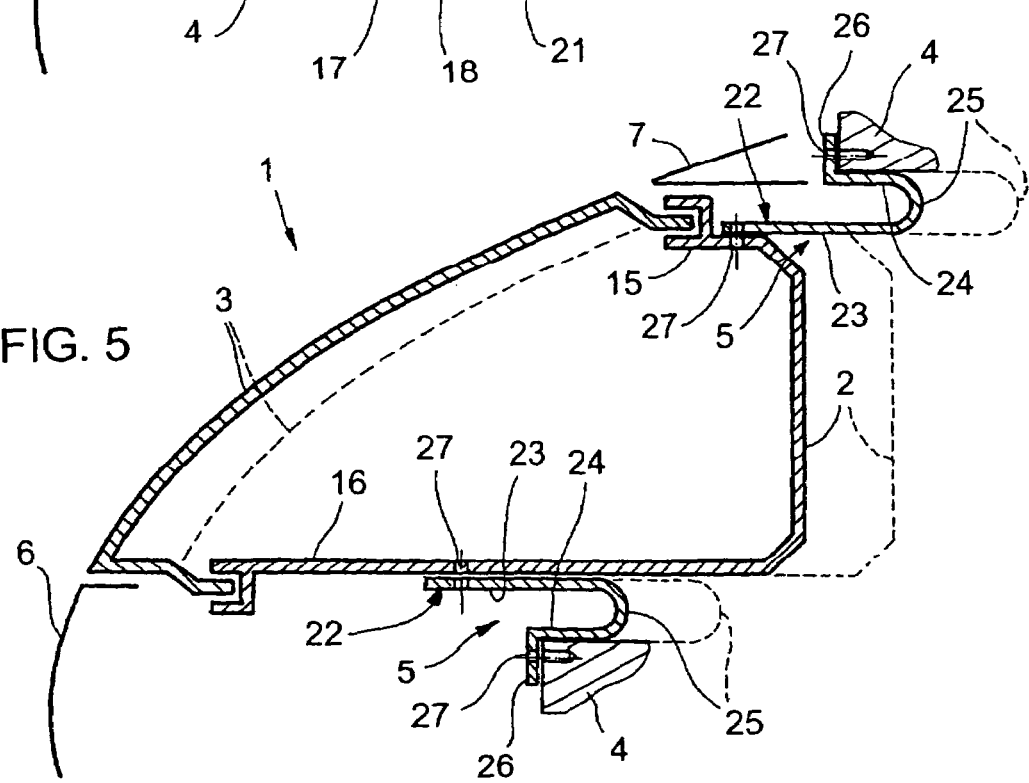

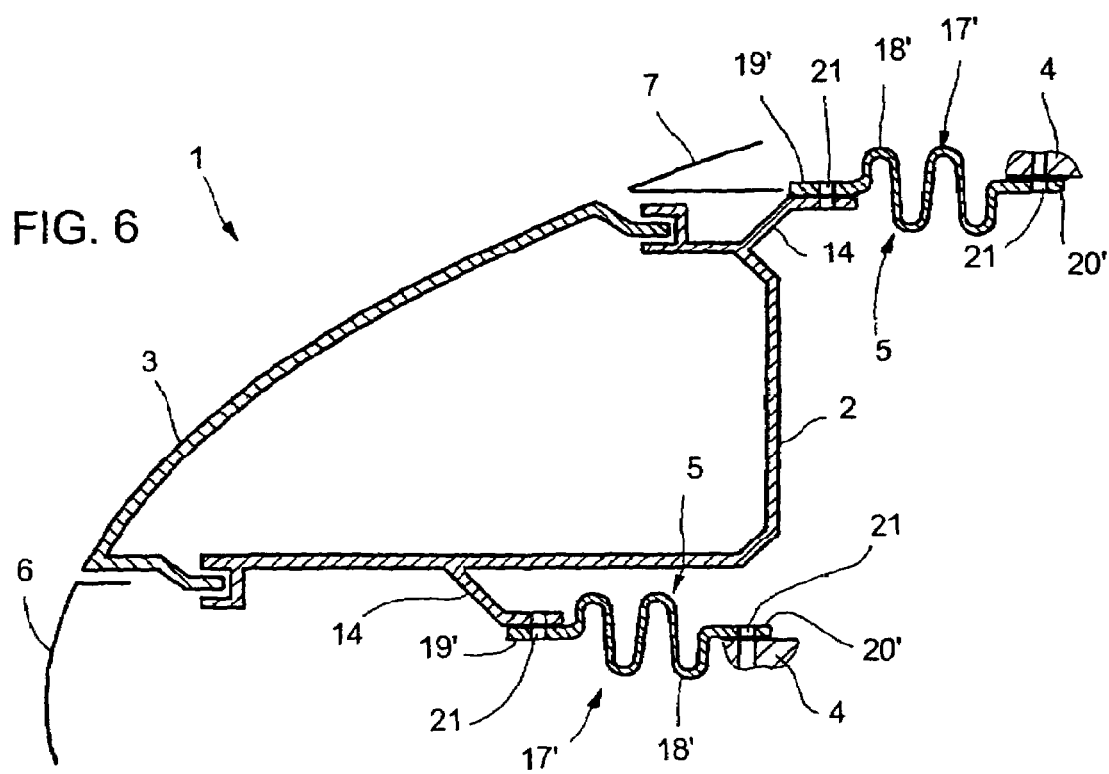
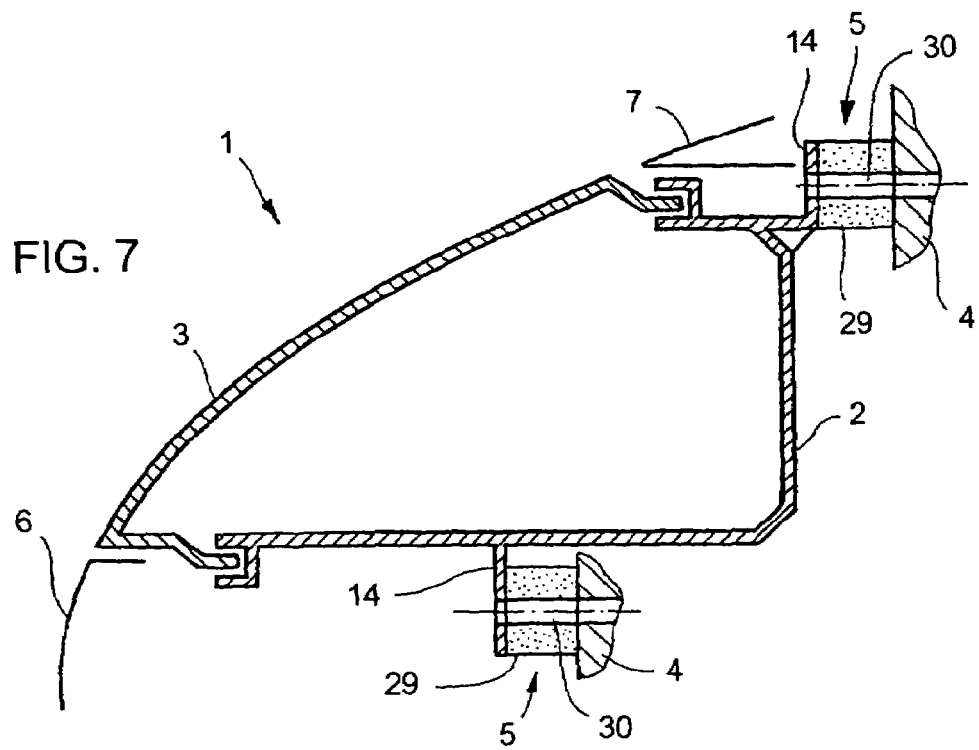

HEADLAMP COMPRISING ENERGY ABSORPTION MEANS

The present application is a continuation of U.S. application Ser. No. 10/665,764, filed Sep. 18, 2003 now U.S. Pat. No. 7,156,545, the contents of which is hereby incorporated by reference in its entirety.

FIELD OF THE INVENTION

The present invention relates to a headlamp for a motor vehicle, comprising a housing fixed on a chassis and enclosing a light source for illuminating the vehicle.

BACKGROUND OF THE INVENTION

As vehicle manufacturers have known for a considerable time, headlamps have an important function in the passive safety of vehicles, particularly in respect of pedestrians with whom collisions may occur.

Such collisions can result in major bodily injury, even at low speeds (less than 40 km/h). Consequently, headlamps are commonly provided with energy absorption means in order to reduce the impact suffered by a pedestrian and thus decrease the risks of serious bodily injury.

One particular example of a headlamp provided with energy absorption means is known from the European Patent Application published under the number EP-1,059,200.

Although known headlamps of this type have enabled considerable progress to be made in respect of passive safety, they have a certain number of disadvantages.

In particular, the addition of energy absorption means frequently requires significant structural modifications of the headlamp, with the addition of numerous parts which make the headlamp more bulky, increase its weight and add to its cost.

The object of the invention is, in particular, to mitigate the aforesaid disadvantages by proposing a headlamp which, while providing optimal passive safety, particularly in respect of pedestrians, has relatively small overall dimensions and comprises a limited number of parts.

SUMMARY OF THE INVENTION

For this purpose, the invention proposes a motor vehicle headlamp of the aforesaid type, which additionally comprises plastically deformable means for connecting the housing to the chassis, these means being capable of absorbing, preferably without breaking, at least part of the energy of an impact on the headlamp.

The invention uses the term "headlamp" in the broadest sense, including any lighting and/or indicating device for a vehicle.

The headlamp thus has relatively limited overall dimensions, while still having good energy absorption capacity. It is also simple to manufacture and its cost has been found to be relatively low.

There are various possible embodiments for the application of the invention.

In a first embodiment, the deformable means can operate in tension.

Thus the deformable means can comprise a lug for fixing the housing to the chassis, this lug being capable of stretching under the effect of an impact on the headlamp.

The lug comprises, for example, a perforated body extended at one end by a front part fixed to the chassis, and at the other end by a rear part fixed to the housing, the body being capable of stretching under the effect of traction exerted on said parts. The lug can comprise a perforated or unperforated body, having at least one area of contracted cross section locally. The perforations in the body are of various shapes, for example rectangular, square, any polygonal or hexagonal shape, or diamond-shaped, or possibly circular or oval.

In a variant, the fixing lug has a corrugated central portion extended at one end by a front part fixed to the chassis, and at the other end by a rear part fixed to the housing, the central portion being capable of stretching under the effect of traction exerted on said parts.

In a second embodiment, the deformable means can operate by bending.

Thus the deformable means can comprise a lug for fixing the housing to the chassis, the lug having a U-shaped profile and comprising two approximately parallel branches, one fixed to the housing and one to the chassis, linked by a curved portion, the lug being deformable by the displacement of the curved portion under the effect of an impact on the headlamp.

In a third embodiment, the deformable means can operate by compression.

Thus the deformable means can comprise a lug for fixing the housing to the chassis, the lug being compressible under the effect of an impact on the headlamp.

This kind of fixing lug has, for example, a corrugated central portion extended at end by a front part fixed to the housing, and at the other end by a rear part fixed to the chassis, the corrugations being capable of being compacted under the effect of an impact on the headlamp.

Instead of this kind of fixing lug, the deformable means can comprise a spacer interposed between the housing and the chassis.

A spacer of this kind can be made, for example, from a compressible material, such as aluminum foam.

In a variant, the spacer comprises a cylindrical barrel, pressed against the chassis at one end and extended at the opposite end by a curved head by means of which the spacer is pressed against the housing.

In yet another variant, the spacer is a functional component of the vehicle, such as an air filter or a windscreen washer reservoir.

The invention will be made clearer by the following description, provided purely by way of example and with reference to the attached drawings, in which:

BRIEF DESCRIPTION OF THE DRAWINGS

FIG. 4 is a view similar to that of FIG. 1, in which the headlamp is provided with deformable connecting means comprising a corrugated fixing lug designed to operate by traction;

FIG. 5 is a view similar to that of FIG. 1, in which the headlamp is provided with deformable connecting means comprising a curved fixing lug designed to operate by bending;

FIG. 6 is a view similar to that of FIG. 1, in which the headlamp is provided with deformable connecting means comprising a corrugated fixing lug designed to operate by compression;

FIG. 7 is a view similar to that of FIG. 1, in which the headlamp is provided with deformable connecting means comprising a spacer made from a compressible material;

DESCRIPTION OF THE PREFERRED EMBODIMENTS

Figure 1:
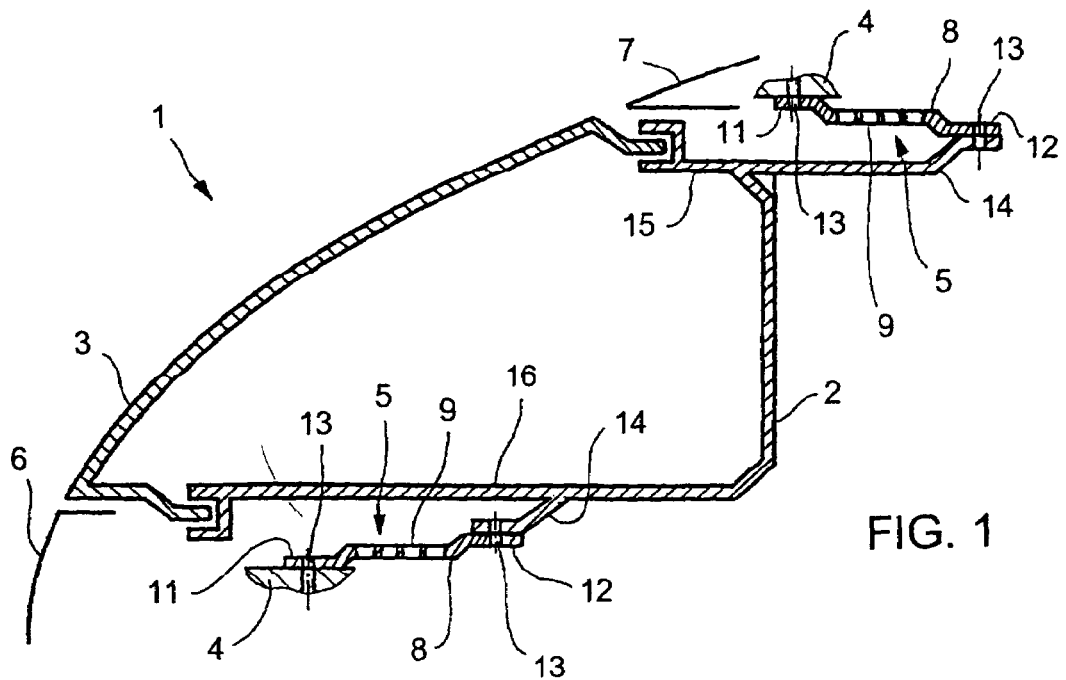
FIG. 1 is a sectional elevation of a motor vehicle headlamp provided with deformable connecting means, comprising a fixing lug designed to operate by traction and having a perforated body.

FIG. 1 shows a headlamp 1 of a motor vehicle, comprising a housing 2 enclosing a certain number of internal components (not shown), including a light source and a reflector on which is mounted the source whose light is reflected and diffused by the reflector.

For convenience, the general direction of illumination of the headlamp 1 will be called the longitudinal direction. In practice, this direction is identical to the direction of movement of the vehicle.

The headlamp 1 also comprises a lens 3 mounted on the housing 2, which it covers in a similar way to a lid, to protect the internal components while transmitting in the forward direction the light emitted by the light source.

The housing 2 is fixed on a chassis 4 consisting of the chassis of the vehicle, with the aid of plastically deformable connecting means 5, which, when undergoing deformation, can absorb at least part of the energy of an impact on the headlamp 1 without breaking.

In case of a collision with an obstacle, the latter strikes the lens 3, which moves backwards from its normal operating position in which it is flush with the adjacent bodywork elements 6 and 7, and pushes the housing 2 backwards.

The housing 2 then exerts on the connecting means 5 a stress which, depending on the configuration of these means, may be tensile, bending or compressive.

In a first embodiment, described here with reference to FIGS. 1 to 4, the connecting means 5 are designed to operate by traction.

Figure 2:
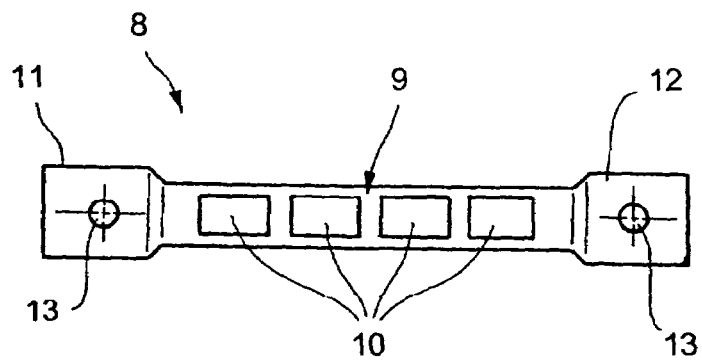
FIG. 2 is a view from above of a fixing lug designed for a headlamp such as that of FIG. 1, shown in isolation, in the absence of any stress.
Figure 3:
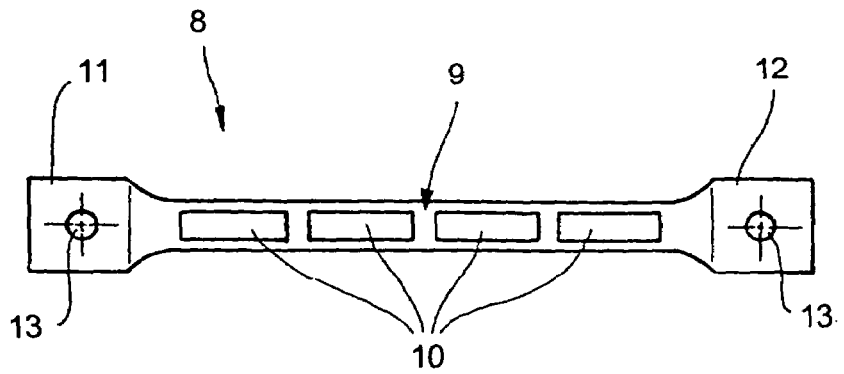
FIG. 3 is a view from above of the lug of FIG. 2, after it has been subject to a tensile stress.

In a first variant, shown in FIGS. 1 to 3, the connecting means 5 comprise a lug 8 for fixing the housing 2 to the chassis 4, this lug being approximately flat and capable of stretching under the effect of an impact on the headlamp 1. This lug 8 is made from a material having low elastic deformability, such as steel or a hard thermoplastic.

As shown in FIG. 2, the lug 8 has a perforated central body 9, pierced with a set of holes 10 of rectangular section. The holes 10 help the body 9 to deform. The body 9 is extended at one end by a front part 11 fixed to the chassis 4, and at the other end by a rear part 12 fixed to the housing 2.

For fixing the front part 11 and the rear part 12, these are pierced with holes 13 for the passage of fixing screws, which can engage, respectively, with the chassis 4 and the housing 2. The housing can also be provided with a projecting support strip 14 for fixing the rear part 12, as shown in FIG. 1.

When fixed at its two ends, the lug 8 extends longitudinally between the housing 2 and the chassis 4. When the housing 2 is displaced longitudinally rearwards by the pressure of the obstacle, it tends to draw with it the rear part 12 of the lug 8 which, being fixed to the chassis 4 by its front part 11, stretches under the effect of the tensile stress thus exerted on the parts 11 and 12, by plastic deformation.

This deformation takes the form of an elongation and a thinning of the body 9, promoted by the presence of the perforations or holes 10, while the parts 11 and 12 largely retain their initial shape, as shown in FIG. 3. By deforming without breaking, the lug 8, which acts in the same way as a tensile test piece, absorbs at least part of the energy of the impact.

In the illustrated example, the headlamp 1 has two fixing lugs 8, one being fixed on an upper wall 15 of the housing 2 and the other on a lower wall 16. Clearly, it is possible to provide larger number of these lugs 8, in order to increase the energy absorption capacity of the headlamp 1.

Figure 10A:
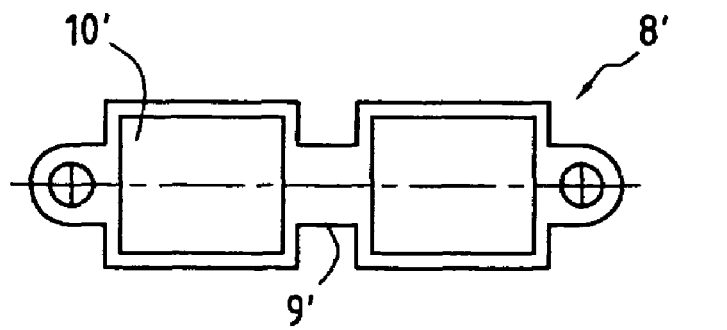
FIGS. 10 and 11 are variants of FIGS. 2 and 3 and are views of lugs which can be deformed by traction.
Figure 10B:
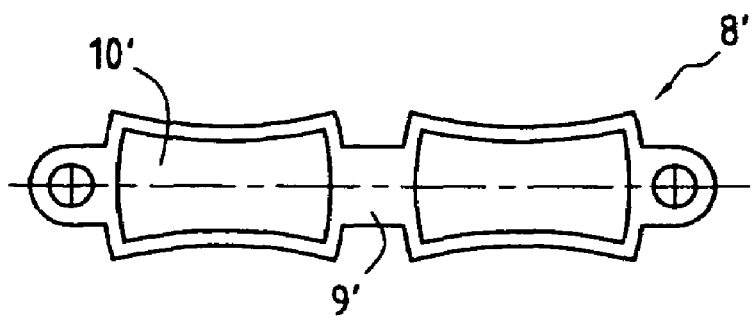
Figure 11A:
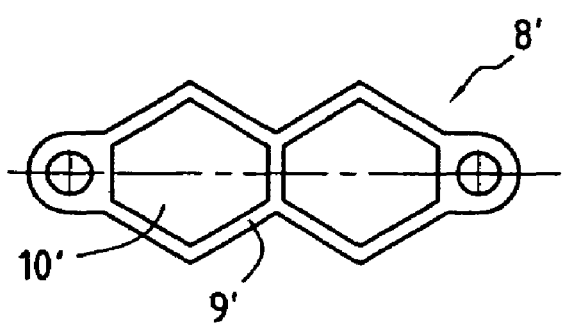
Figure 11B:
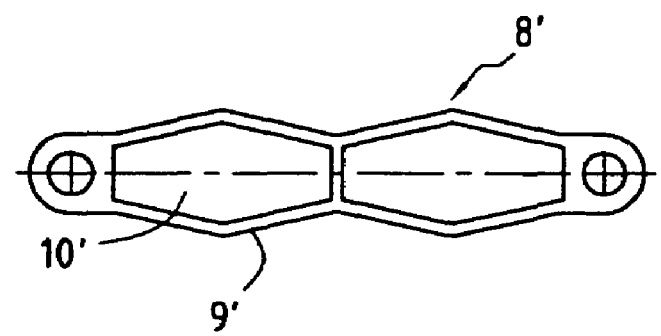

FIGS. 10 and 11 are variants, showing lugs 8' with bodies 9' having rectangular perforations 10' (FIG. 10) or hexagonal perforations (FIG. 11) before (a) and after (b) deformation due to traction. FIG. 10 shows a lug having a contracted cross section in the "solid" area delimiting the two perforations. In FIG. 11, the shape of the perforations is such that there is a de facto contraction of the lug in the area of the body delimiting the two perforations. In both cases, as a result of traction at the time of impact, the perforations 10' are stretched, the lug 8' then being elongated overall by at least 10% of its initial total length, by approximately 20% for example. The elongation may also be greater, depending on the type of material and the shape of the lug.

In a second variant shown in FIG. 4, the connecting means 5 comprise a lug 17 for fixing the housing to the chassis which has a corrugated central portion 18 extended at one end by a front part 19 fixed to the chassis 4, and at the other end by a rear part 20 fixed to the housing 2.

The lug 17 is made, for example, by cutting and bending from a sheet of metal such as a steel sheet, or by thermoforming a hard thermoplastic material.

As described previously, the parts 19 and 20 can be pierced with holes 21 for the passage of fixing screws, the housing 2 being provided with a projecting support 14 for fixing the rear part 20.

If the headlamp 1 collides with an obstacle, the housing 2 is pushed longitudinally backwards and pulls on the lug 17 whose corrugated portion 18 is stretched, undergoing plastic deformation without breaking, under the effect of the tractive force exerted in this way on its parts 19 and 20.

The headlamp 1 comprises two fixing lugs 17, as in the first variant described above, but a larger number could be provided, depending on the level of energy which the headlamp 1 is intended to absorb.

In a second embodiment shown in FIG. 5, the connecting means 5 can operate by bending, and for this purpose comprise a curved lug 22 for fixing the housing 2 to the chassis 4, the lug being positioned between the latter components.

This lug 22, which has a U-shaped profile, comprises two approximately parallel and longitudinally extending branches 23 and 24, namely an inner branch 23, fixed to the housing 2, and an outer branch 24, fixed to the chassis 2, the branches 23 and 24 being linked by a curved portion 25 whose concavity faces forwards.

As shown in FIG. 5, the outer branch 24 is provided with a part bent at a right angle 26, pierced with a hole 27 for the passage of a screw which can engage with the chassis 4 to fix the branch 24 to the latter.

The inner branch 23 is also pierced with a hole 27 for the passage of a screw which can engage with a wall of the housing.

Under the effect of an impact on the headlamp 1, the housing 2 is pushed longitudinally backwards by the lens 3 which has struck the obstacle. In its movement, the housing 2 pulls along the inner branch 23 of the lug 22, while the outer branch 24 remains fixed to the chassis 4. The lug 22 is then deformed in a plastic way, without breaking, by rolling backwards, as shown in broken lines in FIG. 5 (in fact, an area of constant deformation is maintained in this movement).

In this case, two lugs 22 are provided, one fixed on an upper wall 15 and one on a lower wall 16 of the housing 2. However, as in the previous case, it is possible to have a larger number of lugs in order to increase the energy absorption capacity of the headlamp 1.

In a third embodiment, shown in FIGS. 6 to 9, the connecting means 5 can operate by compression.

Thus, in a first variant, shown in FIG. 6, the connecting means 5 comprise a compressible lug 17' for fixing the housing 2 to the chassis 4, comprising a corrugated central portion 18' extended at one end by a front part 19' fixed to the housing 2 and at the other end by a rear part 20' fixed to the chassis 4, the parts 19' and 20' being pierced with holes 21 for the passage of fixing screws.

As shown in FIG. 6, the housing 2 is also provided with a projecting lug 14 for fixing the front part 19'.

As will be understood, this compressible lug 17' has a similar shape to that of the stretchable lug 17 described above. Like the latter, it can be made by cutting and bending a sheet of metal such as a sheet of steel, or by thermoforming a hard thermoplastic material.

If the headlamp 1 collides with an obstacle, the housing 2 is pushed longitudinally backwards and tends to push back the lug 17', whose corrugated portion 18' is compressed, undergoing plastic deformation without breaking, under the effect of the compressive force exerted in this way on its parts 19' and 20'.

In a second variant, shown in FIG. 7, the connecting means 5 comprise a spacer 29 interposed between the housing 2 and the chassis 4, in the form of a cylindrical or prismatic block made from a compressible material, preferably an aluminum foam, which has good energy absorption capacity.

A plurality of these spacers 29 can be placed between the housing 2 and the chassis 4, to increase the absorption capacity of the headlamp 1. In the present case, two spacers 29 are provided, each being interposed between the chassis 4 and a fixing lug 14 projecting from the housing 2.

As shown in FIG. 7, each spacer 29 is pierced with a hole 30 for the passage of a screw for fixing the housing 2 to the chassis 4.

In the course of the impact, the housing 2 moves longitudinally backwards, causing the compression of the spacers 29, which in the course of their plastic deformation absorb at least part of the energy of the impact.

Figure 8:
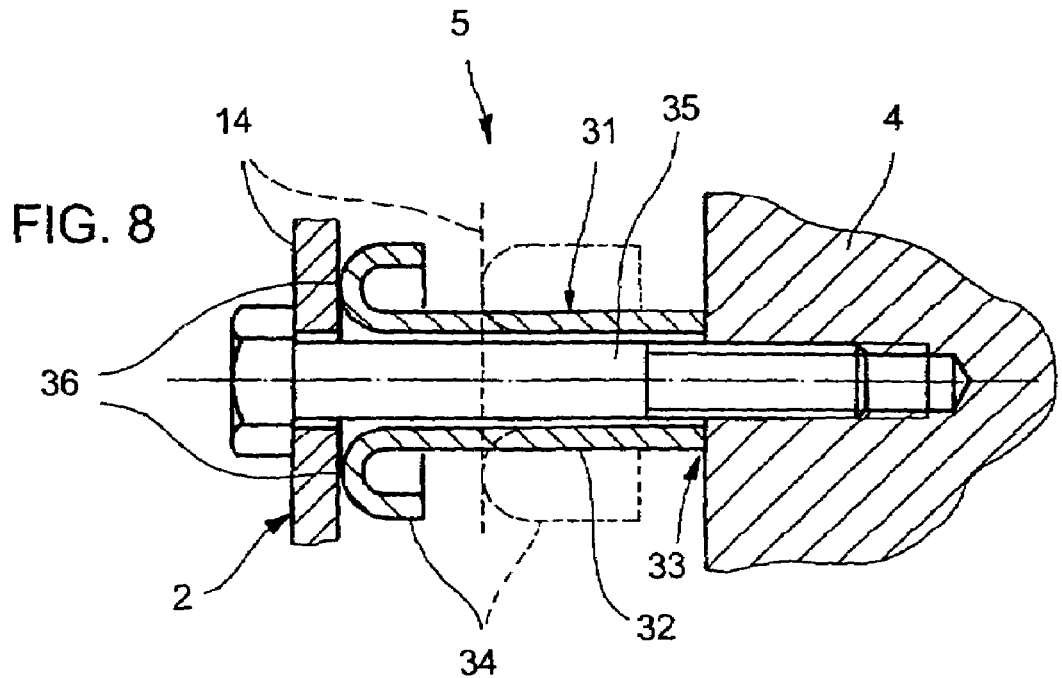
FIG. 8 is a detail view showing part of a headlamp mounted on a fixed chassis with the aid of connecting means comprising a deformable tubular spacer.

In a third variant, shown in FIG. 8, the connecting means 5 comprise a spacer 31, which is interposed between a wall of the housing formed, for example, by a projecting lug 14, and which is provided with a cylindrical barrel 32, terminating rearwards in an end 33 which bears on the chassis 4, and extending in the opposite direction, in other words in the forward direction, in the form of a curved head 34.

As shown in FIG. 8, the barrel 32 is hollow, a screw 35 passing through both the wall 14 of the housing and the barrel 32 to engage with the chassis 4 and thus fix the housing 2 whose wall 14 bears on a toroidal part 36 which connects the head 34 to the barrel 32.

Under the effect of an impact on the headlamp 1, the housing 2 moves longitudinally backwards and crushes the head 34, the wall 14 pushing back the toroidal connecting part 36, as shown in broken lines in FIG. 8. In other words, the spacer 31 contracts in the direction of its rear end 33.

When compressed in this way, the spacer 31 is deformed in a plastic way, absorbing at least part of the energy of the impact without breaking.

Figure 9:
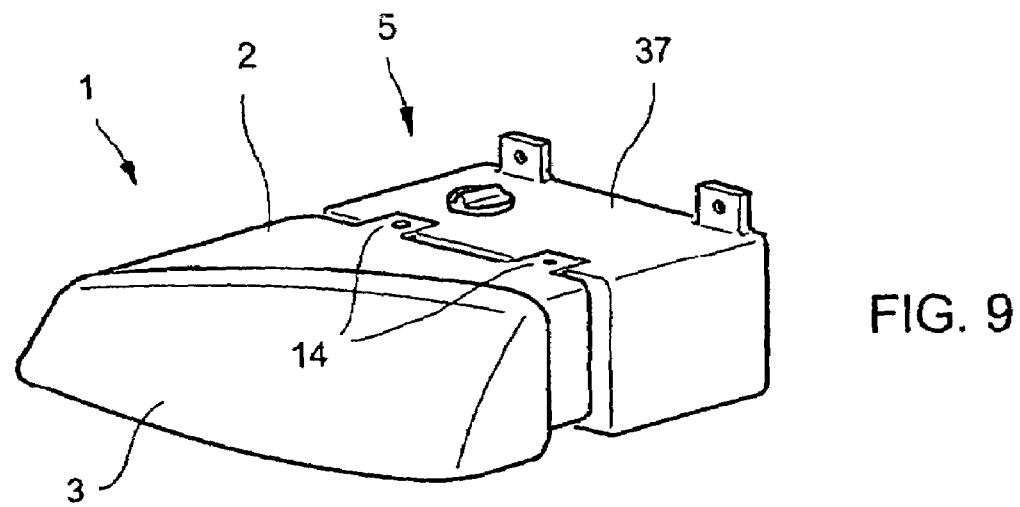
FIG. 9 is a perspective view showing a headlamp mounted on a fixed chassis by means of a functional component of the vehicle.

In a fourth variant, shown in FIG. 9, the means 5 for connecting the housing 2 to the chassis 4 comprise a functional component 37 of the vehicle, on which component 37 the housing 2 is mounted.

As shown in FIG. 9, the housing is fixed directly to the component 37 by means of projecting lugs 14, the component 37 being in turn fixed to the chassis 4 of the vehicle by lugs 38.

This component 37 is, for example, an air filter or a windscreen washer reservoir. Such a component 37 has the advantage of being constructed with a good capacity for absorbing the energy of an impact without breaking.

Thus, regardless of the embodiment chosen, the connecting means 5 have a good capacity for absorbing the energy of an impact on the headlamp 1, thus enhancing the safety of pedestrians for whom the risks of serious bodily injury are thus reduced, the arrangement of the connecting means 5 also enabling the overall dimensions of the headlamp 1 to be limited.

Clearly, the connecting means 5 described above can easily be added to a conventional fixed headlamp without the need for a comprehensive redesign of the headlamp.

What is claimed is:

1. A headlamp for a motor vehicle, comprising:
    a housing enclosing a light source, fixed on a chassis, which comprises means for connecting the housing to the chassis, these means being deformable by bending and capable of absorbing at least part of the energy of an impact on the headlamp,
    wherein the connecting means comprise a lug for fixing the housing to the chassis, this lug being compressible under the effect of an impact on the headlamp, and
    wherein the connecting means comprise a spacer interposed between the housing and the chassis.

2. A headlamp for a motor vehicle, comprising a housing enclosing a light source, fixed on a chassis, which comprises means for connecting the housing to the chassis, these means being deformable by bending and capable of absorbing at least part of the energy of an impact on the headlamp, wherein the connecting means comprise a spacer interposed between the housing and the chassis.

3. The headlamp as claimed in claim 2, wherein the spacer is made from a compressible material.

4. The headlamp as claimed in claim 2, wherein the spacer is made from a foam.

5. The headlamp as claimed in claim 2, wherein the spacer comprises a cylindrical barrel having a first end pressed against the chassis and its opposite end extended in the form of a curved head by means of which the spacer presses against the housing.

6. The headlamp as claimed in claim 2, wherein the spacer is a functional component of the vehicle.

7. The headlamp as claimed in claim 2, wherein the spacer is an air filter.

8. The headlamp as claimed in claim 2, wherein the spacer is a windscreen washer reservoir.

9. A headlamp for a motor vehicle, comprising a housing enclosing a light source, fixed on a chassis, at least one lug for fixing the housing to the chassis, said at least one lug comprises a perforated body having a cross section and at least one contracted cross section thereof and being capable of stretching by traction under the effect of an impact on the headlamp for absorbing at least part of the energy of an impact on the headlamp.

10. A support for fixing a headlamp housing of a motor vehicle to the chassis of the motor vehicle comprising:

at least one lug having a means for connecting the headlamp housing to the chassis and a body with a cross section, said body including at least one contracted cross section, said body, when said at least one lug is connecting the headlamp housing to the chassis, being capable of stretching by traction under the effect of an impact on the headlamp for absorbing at least part of the energy of an impact on the headlamp.

* * * * *